United States Patent [19]
Cruckshank et al.

[11] 3,753,830
[45] Aug. 21, 1973

[54] APPARATUS FOR LAMINATING A PLASTIC SHEET ONTO A SURFACE OF A HOLLOW BODY

[75] Inventors: Ira G. Cruckshank, Rolling Meadows; Thomas J. Snodgrass, Lake Forest, both of Ill.

[73] Assignee: United States Steel Corporation, Pittsburgh, Pa.

[22] Filed: July 13, 1970

[21] Appl. No.: 54,533

[52] U.S. Cl. .................. 156/382, 264/89, 425/388
[51] Int. Cl. ......................................... B29c 17/04
[58] Field of Search .............. 18/2.5 R, 4 R, 19 F; 156/228, 224, 285, 287, 382, 583, 498; 425/167, 292, 388; 264/92, 89, 224

[56] References Cited
UNITED STATES PATENTS

| | | | |
|---|---|---|---|
| 2,354,692 | 8/1944 | Marks .............................. | 156/382 X |
| 3,025,566 | 3/1962 | Kostur ............................. | 425/167 |
| 3,291,874 | 12/1966 | Negoro ............................ | 264/89 |
| 3,338,020 | 8/1967 | McGee ............................ | 156/287 X |
| 3,193,881 | 7/1965 | Kostur ............................. | 18/19 F |
| 2,590,221 | 3/1952 | Stevens ............................ | 156/306 X |
| 2,874,751 | 2/1959 | Norton ............................. | 156/498 X |
| 3,121,767 | 2/1964 | Welshon .......................... | 264/292 |

*Primary Examiner*—George F. Lesmes
*Assistant Examiner*—Henry F. Epstein
*Attorney*—Robert J. Leek, Jr.

[57] ABSTRACT
Apparatus for and a method of laminating a plastic sheet onto a surface of a hollow body are disclosed. The apparatus has a frame, a male die mounted on the frame, a female die mounted on the frame in registry with the male die and in spaced relation to the male die, the female die being adapted to receive the hollow body. Clamping means are operable to receive the plastic sheet and to clamp the plastic sheet in position for the thermoforming operation. Heating means are adjacent to the clamping means for heating the clamped plastic sheet to its softening temperature. The clamping means is first movable with the clamped plastic sheet into the heating means so that the plastic sheet is heated to its softening temperature. The clamping means is then movable with the clamped heated sheet into registry with the male die and the female die. Sealing means are on one of the male die and the female die for sealing against one member of the clamping means and the clamped heated plastic sheet and to define therewith a sealed chamber. The male die has a first vacuum and fluid pressurizing means for applying vacuum and fluid pressure to the male die. A first drive means is connected to the male die for reciprocating the male die toward and away from the female die. The first drive means is operable to move the male die toward the clamped heated sheet and to form the clamped heated sheet about the male die. The first drive means is then operable to move the male die and the clamped formed heated sheet into the hollow body in the female die, and the first vacuum and fluid pressurizing means is operable to apply fluid pressure against the clamped formed heated sheet to apply the clamped formed heated sheet to the surface of the hollow body.

31 Claims, 24 Drawing Figures

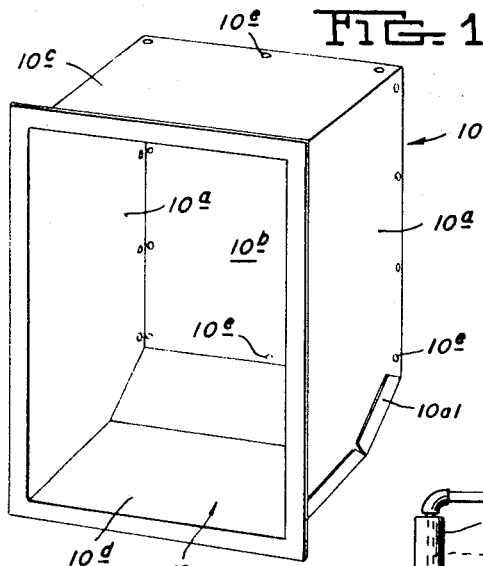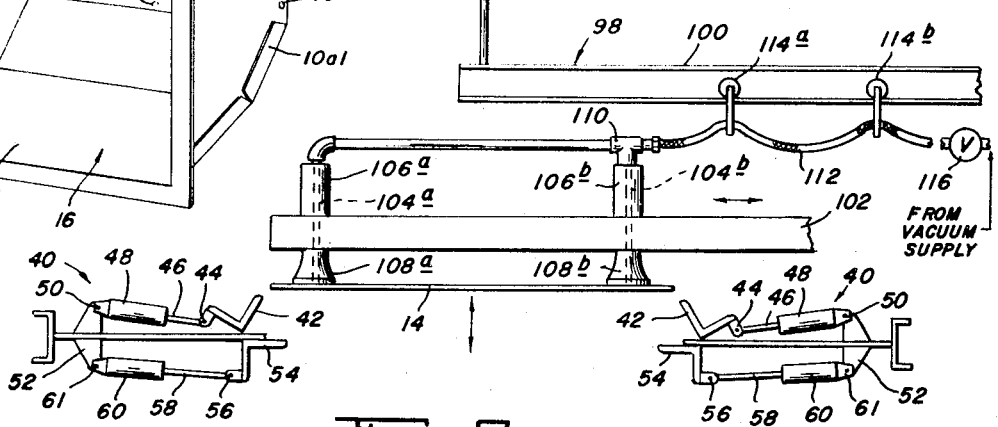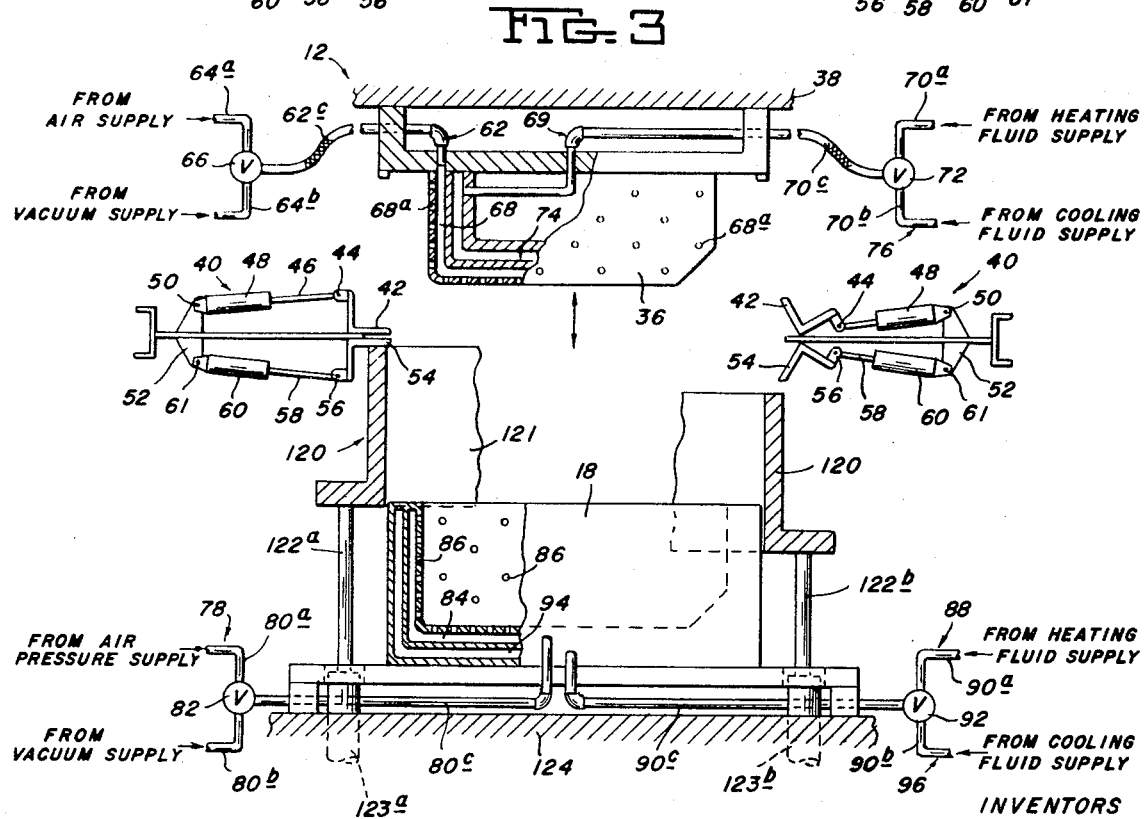

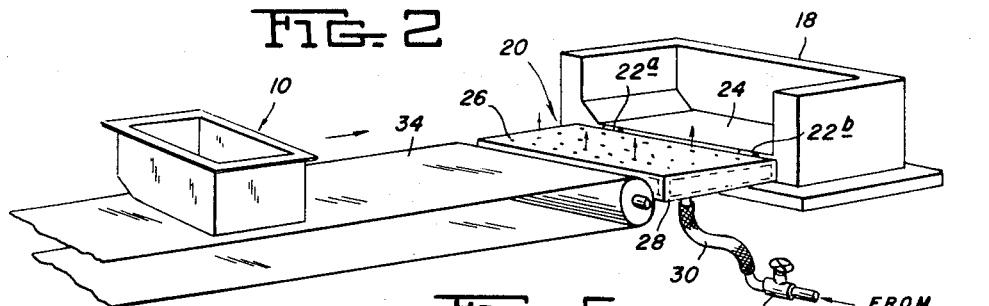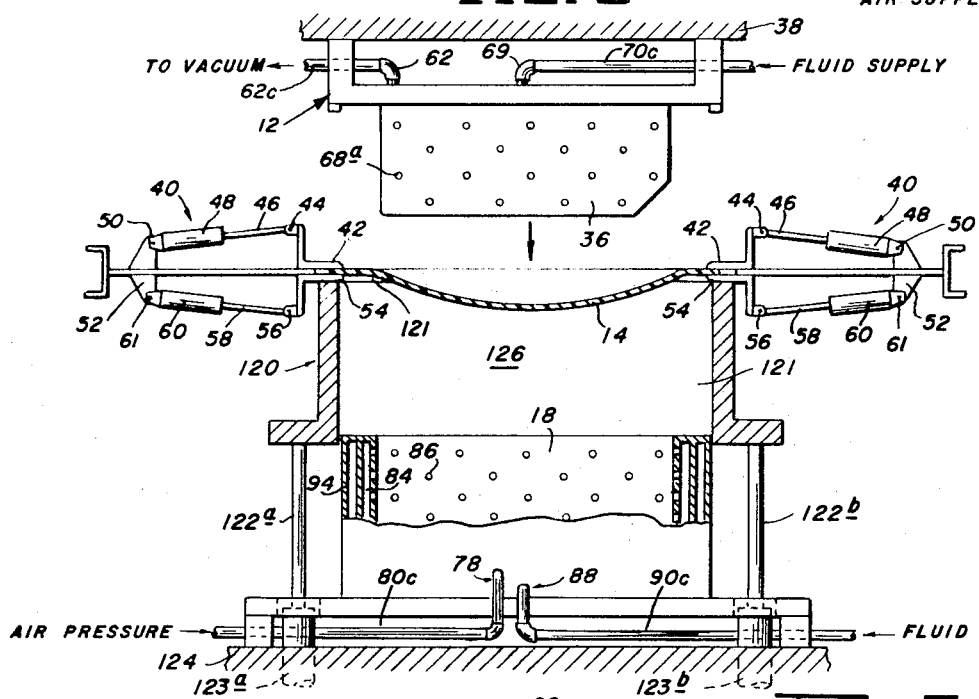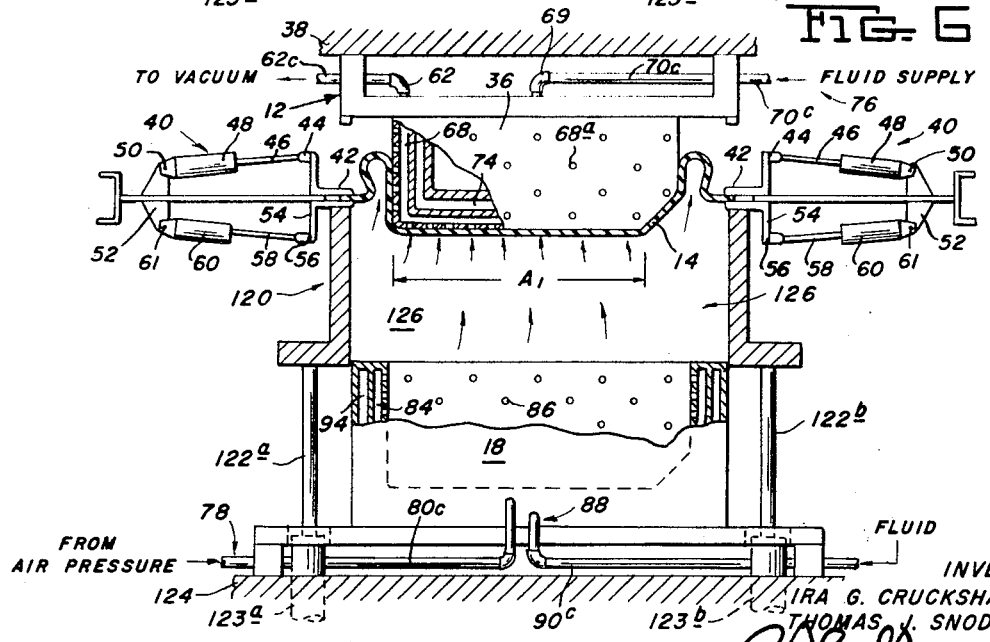

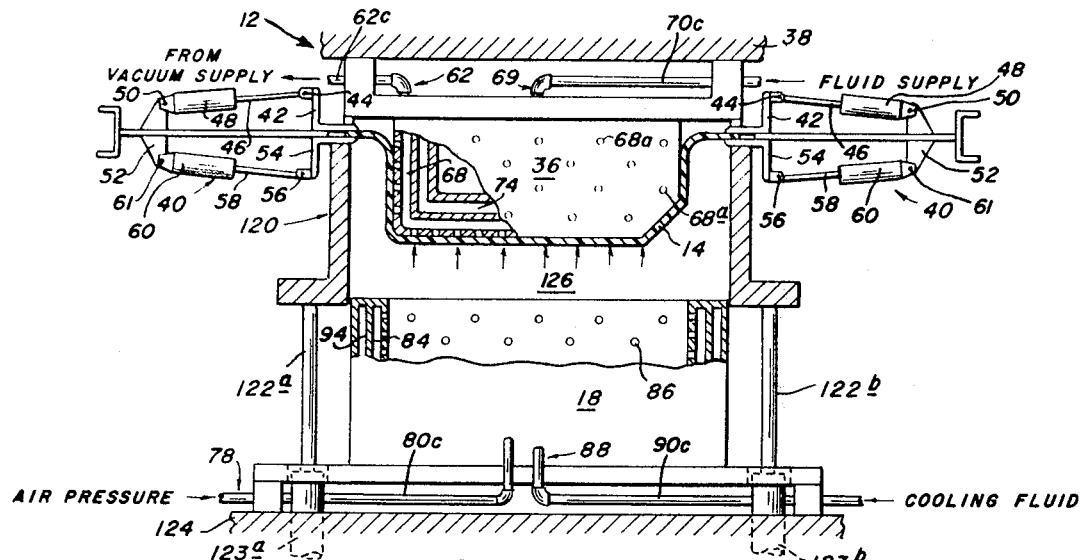
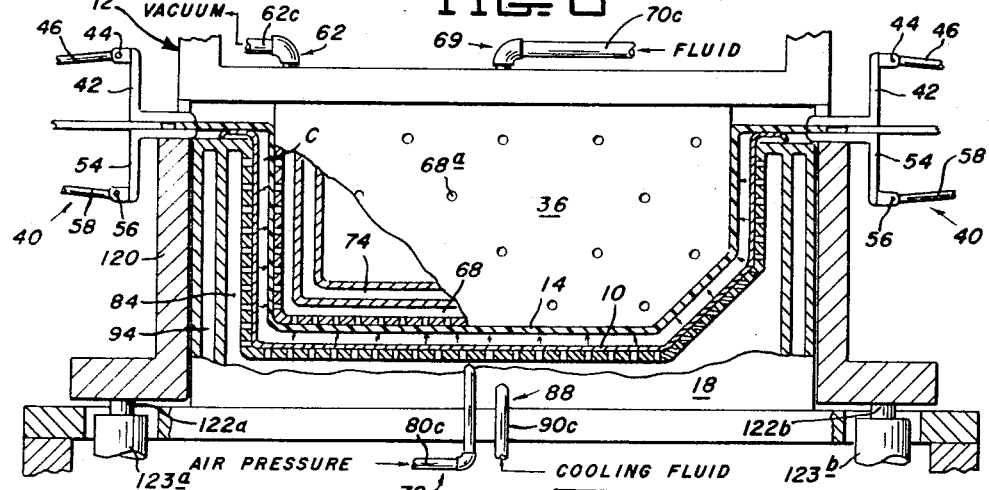
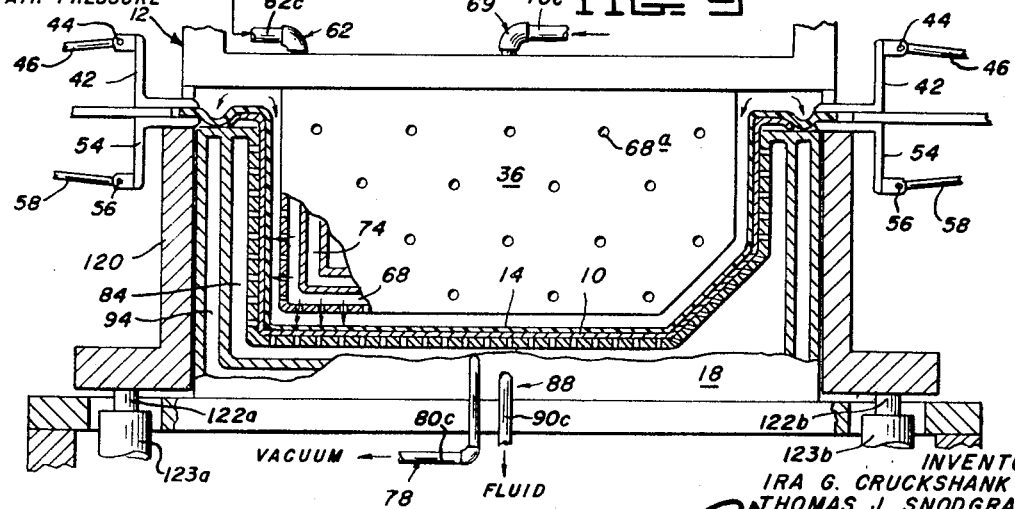

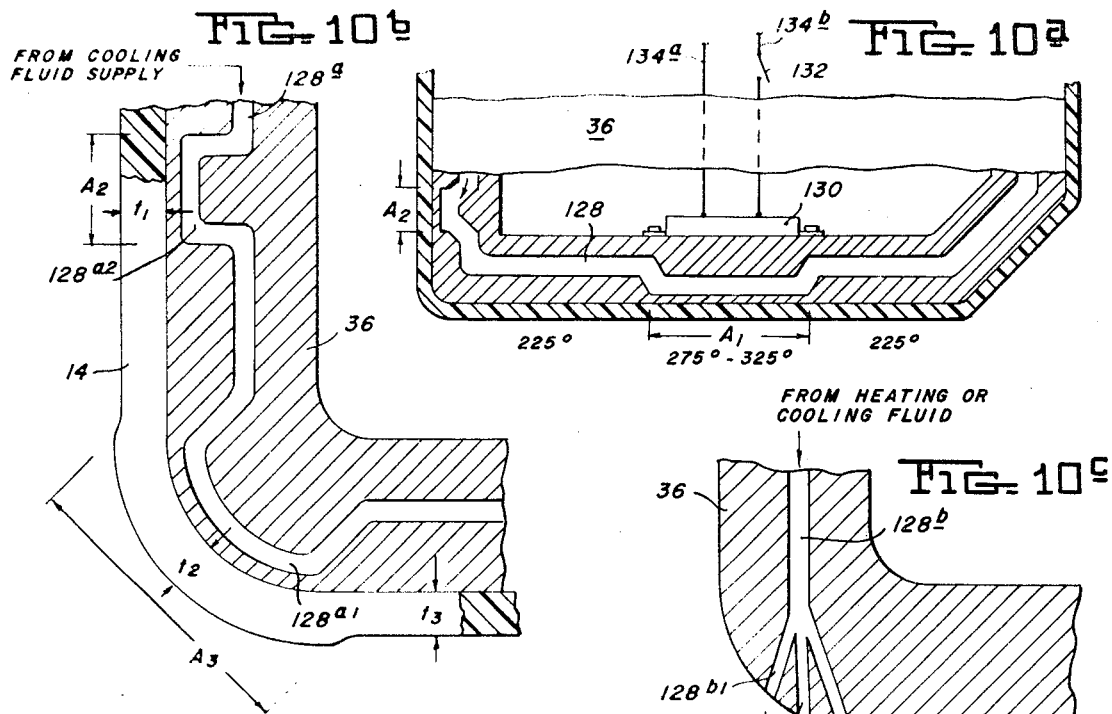
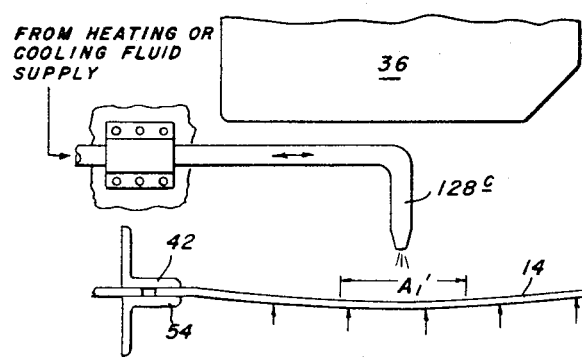
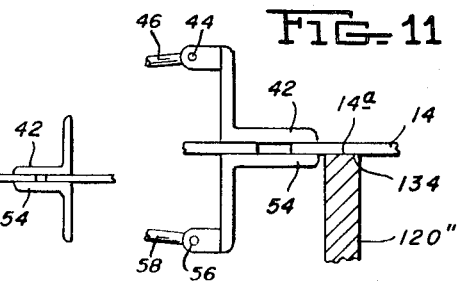
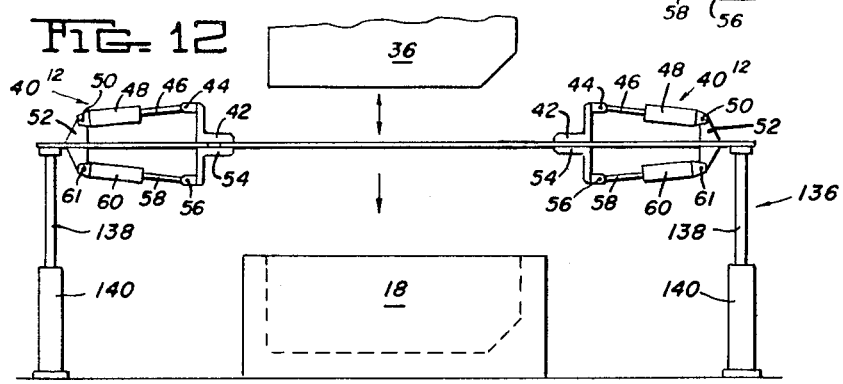

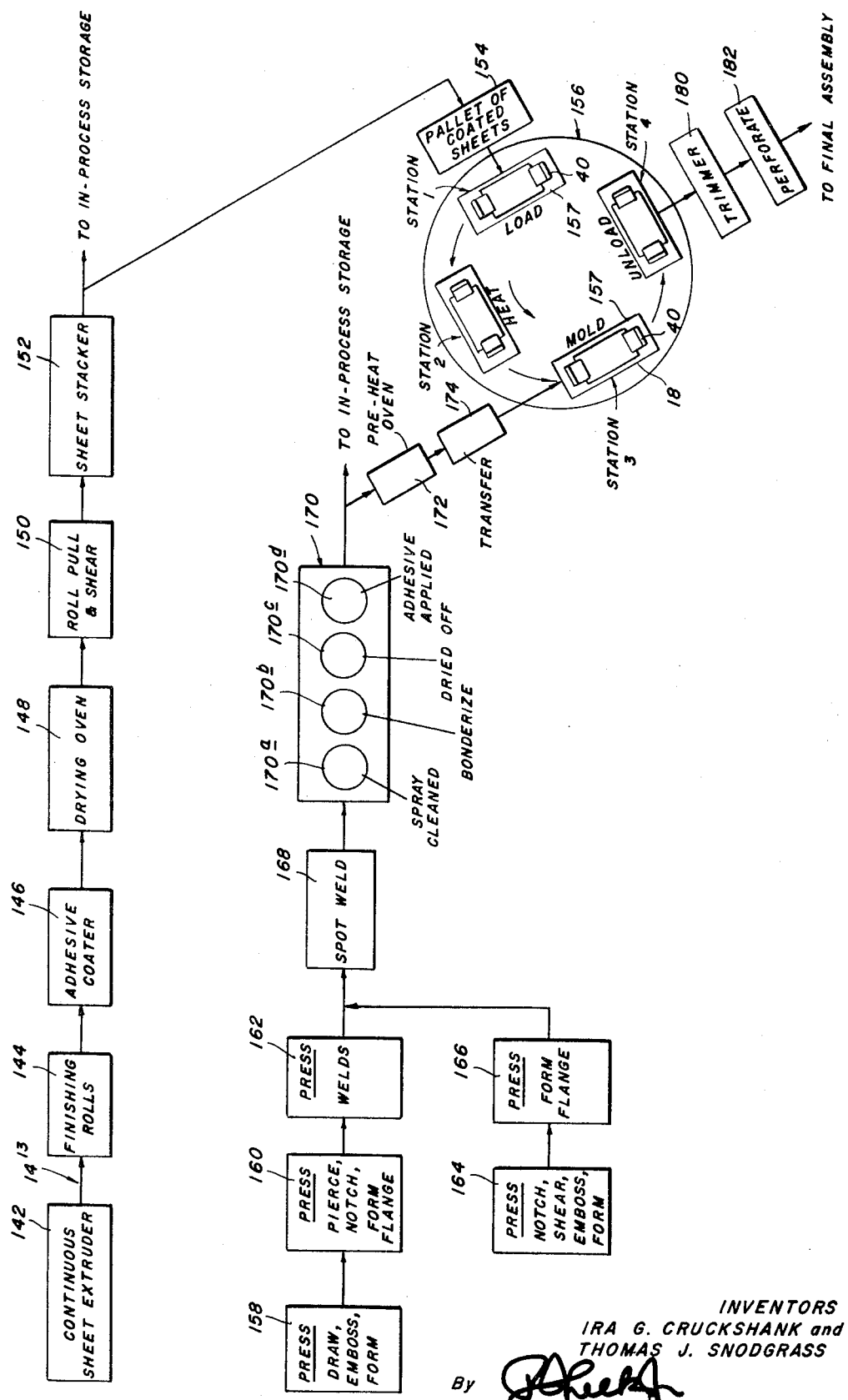

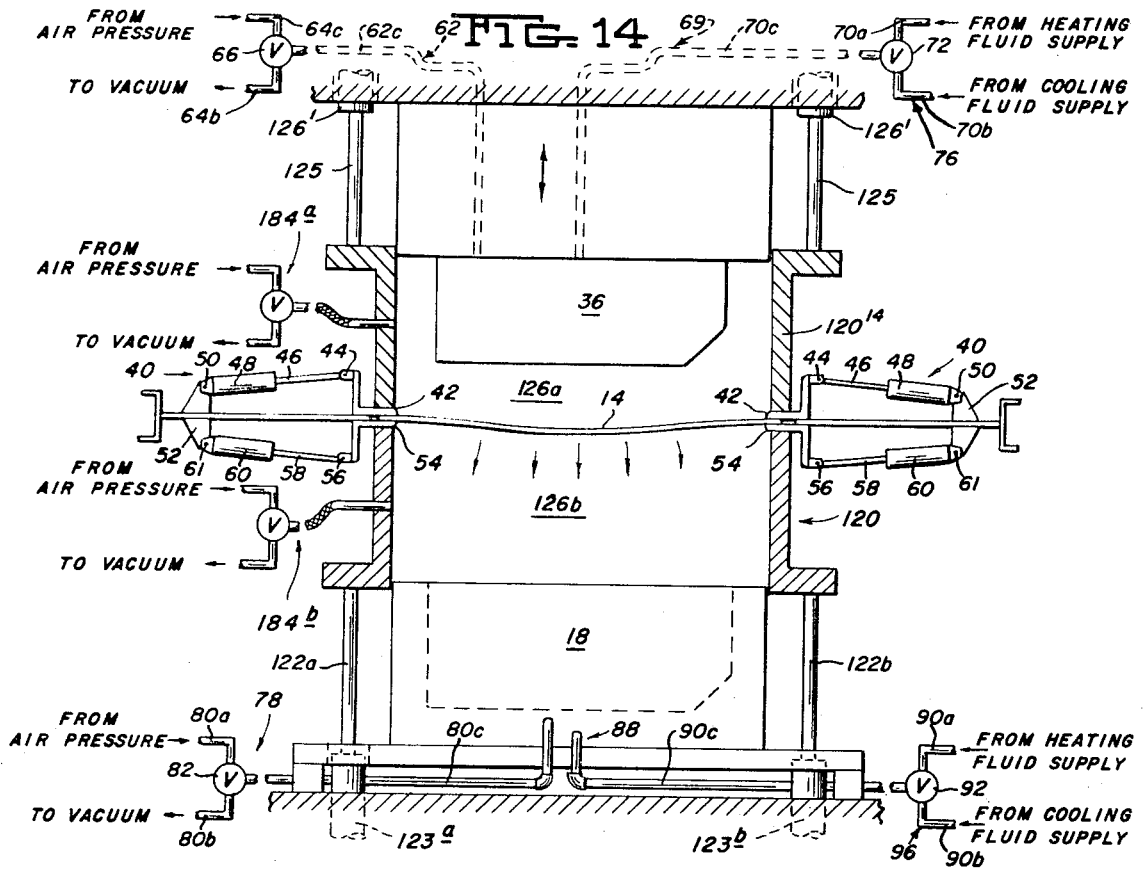
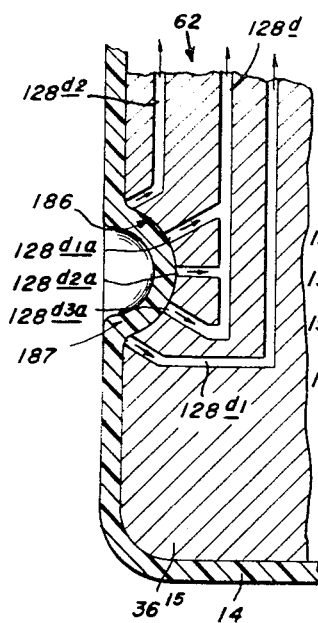
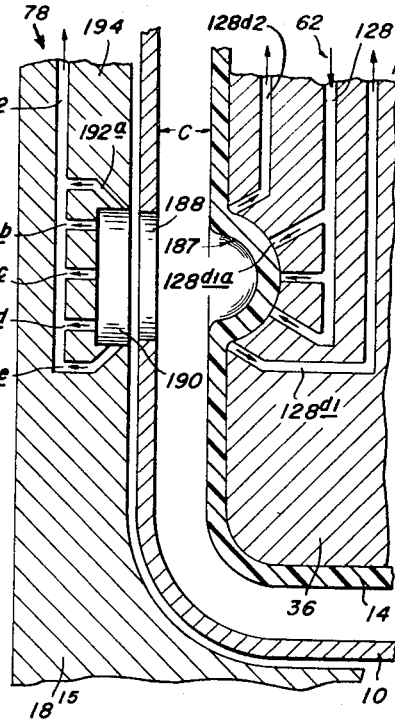
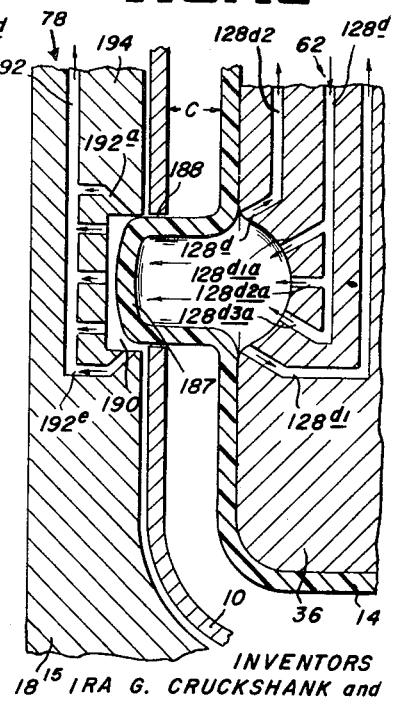
INVENTORS
IRA G. CRUCKSHANK and
THOMAS J. SNODGRASS
By
their Attorney

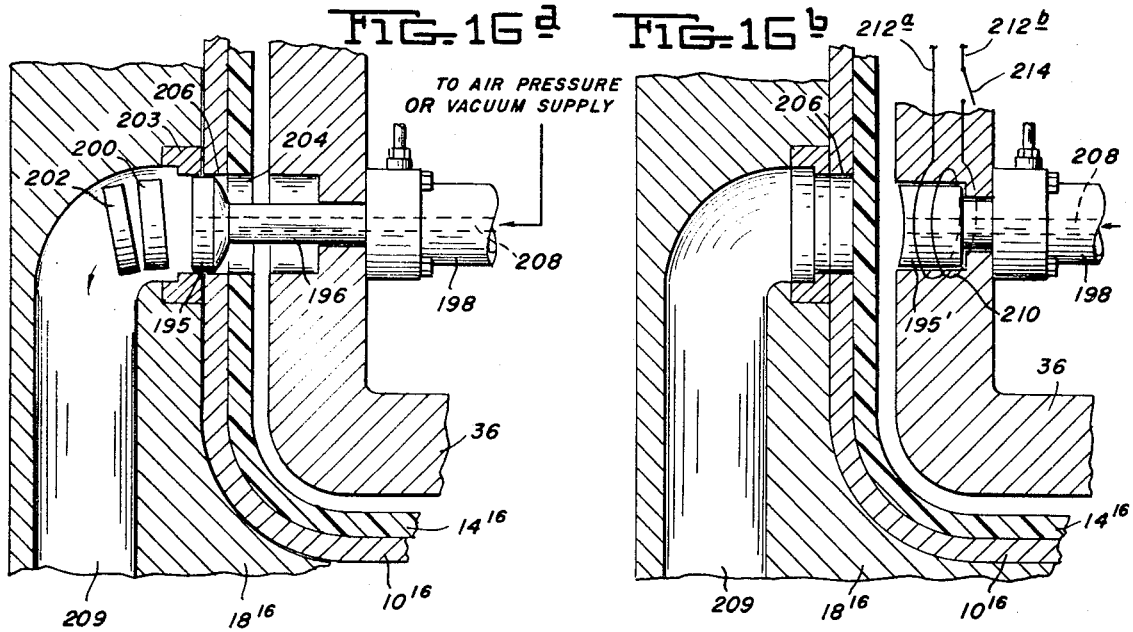
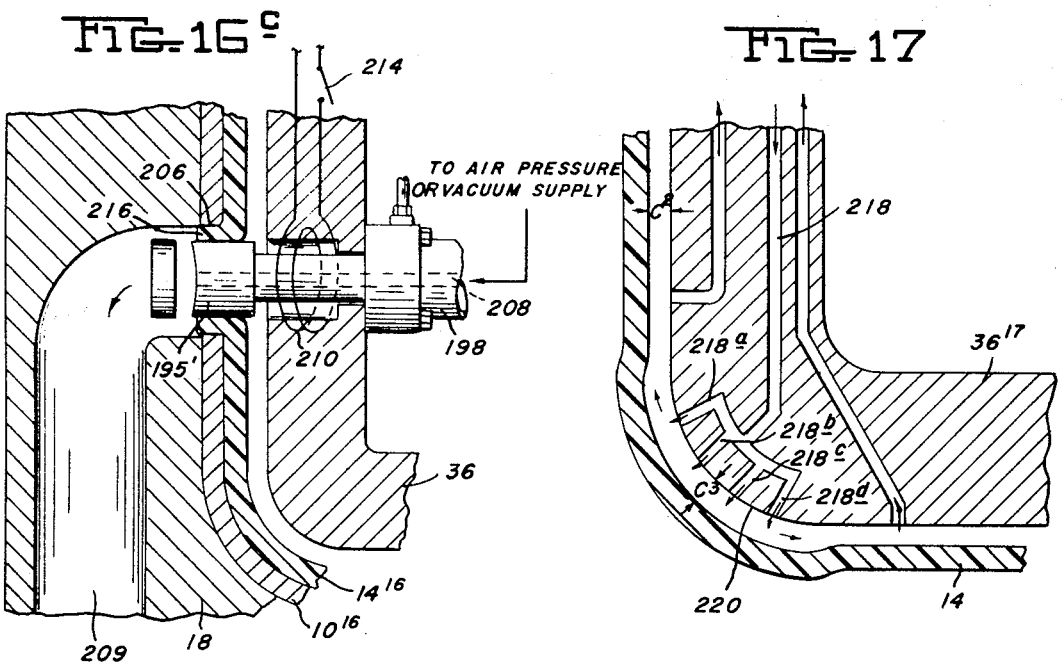

APPARATUS FOR LAMINATING A PLASTIC SHEET ONTO A SURFACE OF A HOLLOW BODY

The method of laminating a plastic sheet onto a surface of a hollow body includes the steps of loading the hollow body into the female die, securing the plastic sheet in a clamping means, heating the clamped sheet to its softening temperature, moving the clamped heated sheet into registry with a male die and the female die, sealing one die of the male die and the female die to one member of the clamping means and the clamped heated plastic sheet to define therewith a sealed chamber, moving the male die toward the clamped heated sheet to form the clamped heated sheet about the male die, moving the male die and the clamped formed heated sheet against the surface of the hollow body in the female die, and applying fluid pressure to the clamped formed heated hollow body to transfer the clamped formed heated sheet to the surface of the hollow body.

BACKGROUND OF THE INVENTION

Heretofore, hollow bodies, such as an inner liner for a refrigerator or the like have been formed of a steel liner with a ceramic coating, a steel liner with a paint coating, injection molded plastic liner, and thermoformed plastic liner. Such conventional liners do not permit the use of thin plastic sheet. The plastic liners are weak and inflexible. The plastic liner shrinks away from the insulation about ½ to ¾ inches at operating temperature. The painted liner has a scratchable finish and is not soundproof. Conventional metal liners utilize a plastic breaker strip to provide a thermal barrier between the cold interior temperature and room temperature to prevent condensation on the outside of the refrigerator. All conventional liners have a poor flexability of and texture of finish.

Conventional apparatus are shown in the following United States Patents:

| U.S. Pat. No. | Inventor | Issued |
|---|---|---|
| 1,270,873 | Robertson | 7/2/18 |
| 2,365,637 | Helwig | 12/19/44 |
| 2,367,642 | Helwig | 1/16/45 |
| 2,377,946 | Leary | 6/12/45 |
| 2,736,065 | Wilcox | 2/28/56 |
| 2,749,572 | Nowak | 6/12/56 |
| 2,873,227 | Olson et al. | 2/10/59 |
| 2,953,814 | Mumford | 9/27/60 |
| 2,973,558 | Stratton | 3/7/61 |
| 2,978,376 | Hulse | 4/4/61 |
| 2,990,581 | Rowe | 7/4/61 |
| 3,070,817 | Kohrn et al. | 1/1/63 |
| 3,074,110 | Mard et al. | 1/22/63 |
| 3,091,946 | Keslin | 6/4/63 |
| 3,166,461 | Sada | 1/19/65 |
| 3,205,110 | Rinderspacher et al. | 9/7/65 |
| 3,205,123 | Hornbostel, Jr. | 9/7/65 |
| 3,318,748 | Hurst | 5/9/67 |
| 3,322,598 | Marks et al. | 5/30/67 |
| 3,338,020 | McGee | 8/29/67 |
| 3,361,610 | Hannes | 1/2/68 |
| 3,379,798 | McNash | 4/23/68 |
| 3,446,686 | Butler et al. | 5/27/69 |
| 3,462,063 | McGee | 8/19/69 |
| 3,466,214 | Polk et al. | 9/9/69 |
| 3,025,566 | Kostur | 3/20/62 |
| 3,073,036 | Kostur | 1/15/63 |
| 3,192,800 | Kostur | 7/6/65 |
| 3,193,881 | Kostur | 7/13/65 |
| 3,267,521 | Kostur | 8/23/66 |
| 3,287,877 | Kostur | 11/29/66 |
| 3,315,438 | Kostur | 4/25/67 |
| 3,446,096 | Kostur | 5/27/69 |
| Re 25,466 | Kostur | 10/22/63 |
| Re 25,484 | Kostur | 11/26/63 |

OBJECTS OF THE INVENTION

It is the general object of this invention to avoid and overcome the foregoing and other difficulties of and objections to prior art practices by the provision of an improved apparatus for and method of laminating a plastic sheet onto a surface of a hollow body, which apparatus and method:

1. permit the use of thin plastic sheets having desirable corrosion resistance and appearance properties over a strong metallic liner;

2. provide a stronger and more flexible coated hollow body such as the inner liner for a refrigerator or the like;

3. provide a plastic coating which expands and contracts at a same rate or coefficient of expansion as the strong metallic hollow body or liner;

4. provide the desirable appearance, and cleanability of the plastic and the strength of the metal in the hollow body or liner;

5. reduce the cost of the completed coated hollow body or liner;

6. provide a superior finish to that provided on a painted metallic hollow liner in both wear and soundproofing properties;

7. eliminate the standard breaker strip commonly used on conventional refrigerators when a ceramic coated steel liner or the like is employed;

8. permit a flexibility and texture of finish in the coated finished liner;

9. permit side loading of the steel or metal liner into the female die;

10. permit air float loading of the steel or metal liner into the female die;

11. selectively heat or cool predetermined areas of the plastic sheet to provide either reinforcing or thinning of the plastic material;

12. cut holes, slots or the like in the plastic sheet and in the steel or metal liner during the forming cycle;

13. withhold contact between the formed plastic sheet and the hollow liner until the final application of the plastic sheet to the hollow body or liner thereby eliminating the dragging of portions of the heated plastic sheet over the edges of the hollow body and the tearing or stretching of the plastic sheet;

14. permit the formation of multiple complex shapes in the finished coated hollow body or liner;

15. increase production by permitting automatic removal of the completed coated hollow body from the clamping means of the apparatus and method;

16. permit automatic sheet loading of the plastic sheet;

17. permit use of air floatation of the plastic sheet in critical areas of forming, such as a sharp corner, an edge or the like of the liner;

18. permit the forming of blisters or bubbles of uniform thickness through holes, slots or the like in the preformed hollow steel body;

19. permit forming of a trapped shaped, such as a hole, a slot or the like in a hollow body;

20. permit the use of a resilient adhesive between the plastic sheet and the metal surface of the hollow body; and 21. minimize the rupturing of the plastic sheet during the forming operation on the male die and permit the use of lower strength and poorer quality plastic sheets in the forming cycle.

BRIEF SUMMARY OF THE INVENTION

The aforesaid objects of this invention, and other objects which will become apparent as the description proceeds, are achieved by providing an improved apparatus for and method of laminating a plastic sheet onto a surface of a hollow body. The apparatus has a frame, a male die mounted on the frame, a female die mounted on the frame in registry with the male die and in spaced relation to the male die, the female die being adapted to receive the hollow body. Clamping means are operable to receive the plastic sheet and to clamp the plastic sheet in position for the thermoforming operation. Heating means are adjacent to the clamping means for heating the clamped plastic sheet to its softening temperature. The clamping means are first movable with the clamped plastic sheet into the heating means so that the plastic sheet is heated to its softening temperature. The clamping means is then movable with the clamped heated sheet into registry with the male die and the female die. Sealing means are on one die of the male die and the female die for sealing one member of the clamping means and the clamped heated plastic sheet to define therewith a sealed chamber. The male die has a first vacuum and fluid pressurizing means for applying vacuum and fluid pressure to the male die. A first drive means is connected to the male die for reciprocating the male die toward and away from the female die. The first drive means is operable to move the male die toward the clamped heated sheet and to form the clamped heated sheet about the male die. The first drive means is then operable to move the male die and the clamped formed heated sheet into the hollow body in the female die, and the first vacuum and fluid pressurizing means is operable to apply fluid pressure against the clamped formed heated sheet to apply the clamped formed heated sheet to the surface of the hollow body.

The method includes the steps of:

a. loading the hollow body into a female die;
b. securing the plastic sheet;
c. heating the clamped sheet to its softening temperature;
d. moving the clamped heated sheet into registry with a male die and the female die;
e. sealing one die of the male die and the female die to one member of the clamping means and the clamped heated plastic sheet to define therewith a sealed chamber;
f. moving the male die toward the clamped heated sheet to form the clamped heated sheet about the male die;
g. moving the male die and the clamped formed heated sheet against the surface of the hollow body in the female die; and
h. applying fluid pressure to the clamped formed heated sheet to transfer the clamped formed heated sheet to the surface of the hollow body.

BRIEF DESCRIPTION OF THE SEVERAL VIEWS OF THE DRAWINGS

For a better understanding of this invention, reference should be had to the accompanying drawings, wherein like numerals of reference indicate similar parts through the several views and wherein:

FIG. 1 is a perspective view of a hollow body such as a steel liner for a refrigerator or the like;

FIG. 2 is a perspective view of a conveyor for conveying the steel liner onto an adjacent pivotable inlet side of the female die and showing air float holes in the inlet side for transferring the liner into the female die;

FIG. 3 is a diagrammatic side elevational view of the male die, female die and clamping means and showing the left hand movable jaws thereof in the closed position and the right hand movable jaws thereof in the open position;

FIG. 4 is a diagrammatic side elevational view of the clamping means and a vacuum type plastic sheet transfer means for picking up the plastic sheet and transferring such plastic sheet through the open male die jaws to the closed female die jaws;

FIG. 5 is a diagrammatic side elevational view showing the male die in its upper position, the clamping means having returned the clamped heated plastic sheet into registry with the male die and the female die, the male die carrying the sealing means having been moved upwardly so that the sealing means seals against the clamping means to form the sealed chamber, and also showing the clamped heated plastic sheet having shifted downwardly due to gravity;

FIG. 6 is a view similar to FIG. 5 showing fluid pressure from the second vacuum and fluid pressurize means associated with the female die having stretched upwardly the clamped heated plastic sheet and also showing the male die moved downwardly through the clamped stretched heated plastic sheet to partially form such plastic sheet about a substantial portion of the male die;

FIG. 7 is a view similar to views 5 and 6 and showing the further downward movement of the male die into the plastic sheet to substantially complete the forming of such stretched plastic sheet about the male die;

FIG. 8 is an enlarged view similar to views 5 through 7 and showing the male die and the formed plastic sheet substantially bottomed in the liner in the female die and also showing fluid pressure from the second vacuum and fluid pressurize means associated with the female die cushioning the bottoming movement of such male die and the formed plastic sheet, and also showing vacuum applied from the first vacuum and fluid pressurize means associated with the male die sucking or pulling the formed plastic sheet against the male die;

FIG. 9 is a view similar to FIG. 8 showing the transfer of the formed plastic sheet to the liner in the female die by the application of air pressure by the first vacuum and fluid pressurizing means associated with the male die and the application of the vacuum by the second vacuum and fluid pressurizing means associated with the female die;

FIG. 10A is a fragmentary sectional view of a portion of the male die, the partially formed plastic sheet and showing the first selected area of such sheet which is heated to a high temperature to thin such selected area of the sheet;

FIG. 10B is a view similar to FIG. 10A showing the first cooling means adapted to selectively cool and thicken and thereby reinforce a third area of the plastic sheet where such third area is subject to stress during forming of the plastic sheet on the male die and also use of such first cooling means to maintain uniform thickness in the second area of such sheet;

FIG. 10C is a view similar to FIGS. 10A,10B showing a first heating means or first cooling means in the male die utilizing spot thinning or spot thickening of a selected area of the plastic sheet before such sheet contacts the male die;

FIG. 10D is a view similar to FIGS. 10A–10C showing an additional heating or cooling means for selectively cooling or heating a section of the plastic sheet prior to the application of a fluid pressure from the second vacuum and fluid pressurizing means of the female die;

FIG. 11 is a fragmentary view similar to FIG. 6 showing the sealing means sealed against the edges of the plastic sheet;

FIG. 12 is a view similar to FIG. 6 showing the clamping means connected to a reciprocating means for moving the clamping means relative to the male die and the female die;

FIG. 13 is a diagrammatic plan view of an automatic rotary machine of the type shown in U.S. Pat. No. 3,192,800, issued July 6, 1965 to J. E. Kostur for "Rotatable Turret Molding Machine" and an associated production line for the plastic sheets and liner;

FIG. 14 is a view similar to FIG. 5 showing the sealing means carried by the male die;

FIG. 15A is a fragmentary sectional view showing the first cavity in the male die for gathering the plastic in said first cavity with uniform thickness and the first vacuum and fluid pressurizing means applying vacuum to the plastic sheet;

FIG. 15B is a view similar to FIG. 16C of the application portion of the forming cycle showing the first hole or slot in the liner, the first vacuum and fluid pressurizing means applying fluid pressure to the gathered material and the second vacuum and fluid pressurizing means applying vacuum to the gathered material to transfer it through the hole or slot in the liner and into the second cavity in the female die;

FIG. 15C is a view similar to FIG. 15B showing the transfer of the gathered material;

FIG. 16A is a fragmentary sectional view showing the punching member in the male die for punching a plastic slug from the plastic sheet and a metal slug from the liner and showing a scrap slug chute in the female die and a vacuum line or fluid pressure line in the punching member for aiding in the removal of such slugs;

FIG. 16B is a view similar to FIG. 16A eliminating the die insert and showing a heating means about the punching member for melting the plastic slug from the plastic sheet;

FIG. 16C is a view similar to FIG. 16B showing the heated punching member covering the raw punched edge of the hole in the liner with melted plastic; and FIG. 17 is a fragmentary sectional view of, for example, the male die provided with a fluid cushion means for fluid floating by fluid pressure, the plastic sheet over an edge or projection in the surface of such die.

Although the principles of this invention are broadly applicable to the lamination of a plastic sheet onto a surface of a hollow body, this invention is particularly adapted for use in conjunction with the laminating of a plastic sheet onto a surface of a liner for a refrigerator or the like, and hence it has been so illustrated and will be so described.

DETAILED DESCRIPTION

Liner 10

With specific reference to the form of this invention illustrated in the drawings, and referring particularly to FIGS. 1, 2, 8, 9 a hollow body, such as a metallic liner for a refrigerator or the like is indicated generally by the reference numeral 10. This liner 10 may be formed of cold rolled steel, hot rolled steel, aluminum, a plastic, such as polypropylene, high impact polystyrene, polycarbonate of the type shown in U.S. Pat. No. 3,117,019, or the like. Such liner 10 (FIG. 1) has sides 10a, back portion 10b, top portion 10c, and bottom portion 10d, and suitable vent holes 10e, disposed in the liner 10 as desired, to permit passage of a fluid therethrough.

A plastic thermoforming apparatus 12 (FIGS. 3, 5, 9) for laminating a plastic sheet 14 (FIGS. 4-9) onto a surface such as the interior surface 16 (FIG. 1) of the liner 10 has a female die 18, shown in FIGS. 2 3,5-9. This female die 18 has an inlet side member 20 (FIG. 2), hinged at 22a and 22b to the bottom portion 24 of the female die 18. Such side portion 20 is provided with air float holes 26 (FIG. 2) which are communicable through a manifold 28 in the side portion 20 and a line 30 through a valve 32 to a suitable high pressure air supply indicated by the arrow in FIG. 2 and by the legend "From Air Supply."

In order to load the liner 10 into the female die 18 a belt type conveyor 34 (FIG. 2) conveys the liner 10 from a preheat oven (not shown) onto the inlet side portion 20 where high pressure air through the air float holes 26 load the liner 10 into the female die 18.

Apparatus 12

Referring now to FIG. 3, such apparatus 12 has a male die 36 (FIGS. 3,5-9) mounted on a platen 38 of an automatic machine of the type shown in U.S. Pat. No. 3,025,566, issued Mar. 29, 1962 to J. E. Kostur for "Automatic Vacuum Forming Machine for Plastics," or the reissued U.S. Pat. Re 25,484, reissued Nov. 2, 1963 to J. E. Kostur for "Automatic Vacuum Forming Machine for Plastics."

Clamping Means 40

Clamping means 40 (FIGS. 3,9) are operable to receive the plastic sheet 14 in position for the thermoforming operation. Such clamping means 40 has a pair of opposed movable male die jaws 42 (FIGS. 3-9), each pivoted at 44 (FIGS. 3-9) to a piston 46 of a fluid cylinder 48, such fluid cylinders 48 being pivoted to 50 on a clamping jaw frame 52 (FIGS. 3-9). In addition, the clamping means 40 also has a pair of opposed female jaws 54 (FIGS. 3-9) pivoted at 56 on a piston 58 of another air fluid cylinder 60, which air cylinder 60 is in turn pivoted at 61 on the frame 52 of the clamping means 40. FIG. 3 shows the left hand male die jaw 42 and female die jaw 54 in the closed position while the right hand male die jaw 42 and female die jaw 54 are shown in the open position.

Below the clamping means 40 a female die 18 (FIG. 3) is disposed in registry with the male die 36 and in spaced relation to the male die 36. The female die 18 is adapted, as explained above, to receive the liner 10.

Plastic Sheet 14

Plastic sheet 14 may be formed of a high-impact polystyrene of the type manufactured by the Chicago Plastic Sheet Company, Chicago, Illinois, or acrylonitrile butadiene styrene of the type manufactured by ABG Plastics Corporation, Portage, Wisconsin, or an acrylic plastic of the type manufactured by ABG Plastics Corporation or the like.

As hereinafter explained (FIG. 13), an adhesive may be used to coat the liner surface 16 of the liner 10 or the side of the plastic sheet 14 adjacent liner 10.

Adhesive

It will be understood by those skilled in the art that a neoprene backed adhesive, similar to the Type SC 193 adhesive made by the HB Fuller Company, St. Paul, Minnesota, or the like, may be applied to the above-mentioned surface 16 of the liner 10 and/or the plastic sheet 14 by conventional means, such as spraying, brushing and the like.

Male Die 36

First Vacuum and Fluid Pressurizing Means 62

As shown in FIGS. 3, 5-9 the male die 36 has a first vacuum and fluid pressurizing means 62. The line 64a extends from an air pressure supply indicated by the arrow in FIG. 3 and the legend "From Air Supply" to a valve 66. The line 64b extends from a vacuum supply means indicated by the arrow in FIG. 3 and the legend "From Vacuum Supply" to the valve 66. A line 62c connects the valve 66 to an air manifold 68 (FIGS. 3,6-9) in the male die 36. Air pressure or vacuum, as desired, exits from the air manifold 68 through suitable holes 68a in the outer wall of the male die 36.

First Heating Means 69

The male die 36 is also provided with a first heating means 69 (FIGS. 3,5-9) having a line 70a (FIG. 3) extending from a heating fluid supply indicated by the arrow in FIG. 3 and the legend "From Heating Fluid Supply" to a valve 72 (FIG. 3). A line 70c connects the valve 72 to a cooling and heating manifold 74 disposed within the male die 36. The heating means 69 is utilized for heating the male die 36 to a temperature such as about 275° to about 350° F to maintain the plastic sheet 14 at its softening temperature and to selectively heat a first area $A_1$ (FIG. 6) of the formed heated sheet 14 and thereby weaken and thin the first area $A_1$ during the forming operation on the male die 36 or to maintain uniform thickness $t_1$ (FIG. 10b) in a second area $A_2$ (FIG. 10b) of the formed heated sheet 14.

First Cooling Means 76

A first cooling means 76 (FIG. 3) of the male die 36 has a line 70b extending from a cooling fluid supply indicated by the arrow in FIG. 3 and the legend "From Cooling Fluid Supply" to the valve 72 through the line 70c and into a cooling and heating manifold 74. The first cooling means 76 is operable to selectively cool and thereby thicken and reinforce a third area $A_3$ (FIG. 10b) of the formed heated sheet 14, which third area $A_3$ is subject to stress during the forming operation on the male die 36 or to maintain uniform thickness $t_1$ (FIG. 10b) in the second area $A_2$(FIG. 10b) of the formed heated sheet 14.

Female Die 18

Second Vacuum and Fluid Pressurizing Means 78

In order to apply vacuum and fluid pressure to the female die 18 (FIG. 3), a second vacuum and fluid pressurizing means 78 (FIGS. 3, 5-9) is provided. Such vacuum and fluid pressurizing means 78 has a line 80a (FIG. 3) extending from a fluid pressure supply indicated in FIG. 3 by an arrow and the legend "From Air Pressure Supply" to a valve 82 and thence through a line 80c to an air manifold 84 disposed within the female die 18. A plurality of air holes 86 (FIG. 3,5-7) connect the air manifold 84 through the inner wall of the female die 18. Alternatively, the second vacuum and fluid pressurizing means 78 may be connected by a line 80b to a vacuum supply indicated by the arrow in FIG. 3 and the legend "From Vacuum Supply."

Second Heating Means 88

In order to maintain the liner 10 at a predetermined temperature during the forming operation, the female die 18 is provided with a second heating means 88 (FIG. 3). Such heating means 88 has a line 90a (FIG. 3) extending from a heating fluid supply indicated by the arrow (FIG. 3) and the legend "From Heating Fluid Supply" in the lower right-hand portion of FIG. 3 to a valve 92 (FIG. 3) and thence to another line 90c to a heating and cooling manifold 94 (FIGS. 3,5-9) provided within the female die 18.

Second Cooling Means 96

For the purpose of selectively cooling a selected area of the liner 10, if desired the female die 18 is provided with a second cooling means 96 (FIG. 3). Such second cooling means 96 utilizes a line 90b extending from a cooling fluid supply indicated in FIG. 3 by the arrow and the legend "From Cooling Fluid Supply" to the valve 92 and thence to the line 90c to the heating and cooling manifold 94.

Sheet Feeder 98

Referring now to FIG. 4, the plastic sheet feeder 98 has a frame 100 and is provided with a reciprocating ram 102 (FIG. 2) movable horizontally in the direction of the horizontal arrows and reciprocable vertically in the direction of the vertical arrows when such reciprocating ram is in registry with the clamping means 40. The reciprocating ram 102 carries a pair of vacuum pickup cups 108a and 108b (FIG. 4), which cups 108a, 108b are connected by branch lines 104a, 104b through their respective cylinders 106a, 106b to a junction point 110 and thence by a supply line 112 to a valve 116 and a vacuum supply indicated by the arrow in the upper portions of FIG. 4 and the legend "From Vacuum Supply." The supply line 112 is movably secured to the frame 100 at 114a, 114b.

The ram 102 moves downwardly from its loading position (not shown) into engagement with a pile of plastic sheets 14 and by means of the vacuum in this system picks up a sheet 14, moves upwardly into the position of the ram 102 shown in FIG. 4 and then horizontally to the left into registry with the now open male die clamping jaw 42 and now closed female die jaw 54. Thereafter, the ram 102 and the plastic sheet 14 move downwardly to deposit the plastic sheet 14 onto the closed female die jaw 54. At this point, the valve 116 cuts off the vacuum and the ram 102 retracks to the position shown in FIG. 4 whereupon the male die clamping jaw 42 closes about the positioned plastic sheet 14 to secure such plastic sheet 14 in the clamping means 40.

Heating of Plastic Sheet 14

The clamping means 40 and the clamped plastic sheet 14 then move into a heating means (not shown) adjacent the clamping means 40 for heating the clamped plastic sheet 14 to a softening temperature, about 275° to about 350° F. Such heating means (not shown) is of the type employed in the automatic vacuum forming machine for plastic disclosed in U.S. Pat. No. 3,025,566, issued Mar. 20, 1962 to J. E. Kostur for "Automatic Vacuum Forming Machine for Plastics." Thereafter, the clamping means 40 and the now heated clamped plastic sheet 14 move into registry with the male die 36 and the female die 18 in the position shown in FIG. 5. It will be noted from a consideration of FIG. 5 that the heated clamped plastic sheet 14 has sagged downwardly slightly due to its own weight.

Sealing Means 120

Sealing means 120 (FIGS. 5–9) are provided on one die of the male die 36 and the female die 18 for sealing one member of the clamping means 40 and the clamped heated plastic sheet 14 to define therewith a sealed chamber 126. In FIG. 3 the sealing means 120 has a die cavity enclosure 121 (FIGS. 3,5,6) mounted on the pistons 122a, 122b of fluid cylinders 123a, 123b (FIGS. 3, 5–9), which cylinders 123a, 123b, in turn are upstanding from a platen 124 of the automatic vacuum forming machine shown in U.S. Pat. No. 3,025,566. In the showing of FIGS. 3 and 5, the die cavity enclosure 121 is moved by the fluid cylinders 123a, 123b (FIGS. 3,5–9) into sealing engagement with the female die clamping jaw 54 of the clamping means 40 to define the sealed chamber 126.

Forming Operation

Thereafter, the male die 36 moves downwardly from the position shown in FIG. 5 to the position shown in FIG. 6. Simultaneously therewith, fluid pressure is applied by the second vacuum and fluid pressurizing means 78 associated with the female die 18 to partially form the clamped heated plastic sheet 14 about the male die 36 as shown in FIG. 6.

The male die 36 then moves downwardly in from the position shown in FIG. 6 to the position shown in FIG. 7 to form the clamped heated plastic sheet 14 about the male die 36.

Application Operation

The male die 36 and the now formed heated clamped plastic sheet 14 then moves downwardly from the position shown in FIG. 7 to the position shown in FIG. 8 to substantially bottom the now formed plastic sheet 14 in the liner 10 disposed in the female die 18. It will be noted from a consideration of FIG. 8 that this bottoming operation is cushioned by the application of fluid pressure from the second vacuum and fluid pressurizing means 78 of the female die and that the clearance C (FIG. 8) between the formed plastic sheet 14 and the heated liner 10 is relatively small and in the neighborhood of about one-sixteenth inch. In order to maintain the heated plastic sheet 14 in close intimate contact with the male die 36 vacuum is applied to such sheet 14 by the first vacuum and fluid pressurizing means 62.

For the purpose of transferring the formed heated plastic sheet to the heated liner 10, fluid pressure from the first vacuum and fluid pressurizing means 62 is applied to the plastic sheet 14 as such male die 36 completes its bottoming movement as shown in FIG. 9. Simultaneously therewith the second vacuum and fluid pressurizing means 78 associated with the female die 18 applies a vacuum through the liner 10 to securely fit the formed heated plastic sheet 14 in intimate contact with the heated liner 10.

ALTERNATIVE EMBODIMENTS

It will be understood by those skilled in the art that alternatively in order to permit the first heating means 69(FIG. 3) to selectively heat the first area $A_1$ (FIGS. 6,10A) to, for example, a temperature of about 275° to about 325° F, the first heating and cooling manifold 74 may be positioned (FIG. 6) closer to the outer wall of the male die 36 adjacent the first area $A_1$. Alternatively, as shown in FIG. 10A, a high temperature heating line 128 may be provided adjacent area $A_1$ to achieve the selective thinning of area A1 or an additional heater, such as an electric strip heater 130 may be secured to the male die 36 and connected through a switch 132 by lines 134a, 134b.

In FIG. 10B, the first cooling means 76 (FIGS. 3,6) utilizes the cooling line 128a, has a portion 128a1 (FIG. 10B) disposed adjacent the third area $A_3$ of the plastic sheet 14, which area $A_3$ is subject to stress. The portion 128a1 cools and thereby thickens it to $t_2$ (FIG. 10B) and reinforces such area $A_3$. The first cooling means 76 (FIG. 6) may also employ the portion 128a2 of the line 128a adjacent a second area $A_2$ (FIG. 10B) to maintain uniform thickness $t_1$ (FIG. 10B) therein.

FIG. 10C shows a heating or cooling line 128b (in this case, a cooling line 128b) having a plurality of apertures 128b1, 128b2, 128b3 adjacent a third area $A_3$ of the plastic sheet 14 where jets (indicated by the arrows in FIG. 10C) of fluid, such as cooling air or the like, are employed to thicken the area $A_3$ to a thickness $t_2$ greater than the adjacent thickness $t_3$. The line 128c in FIG. 10D is connected either to a heating fluid or cooling fluid source indicated by the arrows and legend "From Heating Fluid or Cooling Fluid Supply" to selectively cool or heat an area of the plastic sheet 14 prior to the application of pressurizing fluid from the second vacuum and fluid pressurizing means 78 (FIG. 6). If, for example, as shown in FIG. 10D, a heated fluid (indicated by the arrows in FIG. 10D) is applied to an area $A_1'$, the area $A_1'$ will thin when the fluid pressure from means 78 is applied, and on the other hand, if cooling fluid is applied to such area $A_1'$ (FIG. 10D), such area $A_1'$ will remain at a greater thickness (not shown) when air is applied by means 78 to the plastic sheet 14.

FIG. 11 shows the sealing means 120'' sealed at 134 against the edge 14a of the plastic sheet 14.

FIG. 12 shows a vertical reciprocating means 136 having the clamping means $40^{12}$ mounted on pistons 138 of air cylinders 140 to move the clamping means $40^{12}$ vertically relative to the male die 36 and female die 18.

FIG. 13 shows an automated assembly line for the manufacture of the plastic coated liner 10. In FIG. 13, a continuous sheet extruder 142 forms a continuous plastic sheet $14^{13}$. Finishing rolls 144 polish the continuous plastic sheet $14^{13}$ and reduce it to the desired thickness. An adhesive coater 146 applies the adhesive to one side of the continuous plastic sheet $14^{13}$ and a drying oven 148 evaporates the solvents contained in the adhesive applied to the one side of the continuous plastic sheet $14^{13}$. A roll pull and shear mechanism 150 cuts the continuous plastic sheet $14^{13}$ into the plastic sheets 14 of predetermined length and a sheet stacker 152 stacks the cut plastic sheets 14 on a pallet 154 preparatory for delivery of the pallet 154 to a four-station plastic cooling machine 156 of the type shown in U.S.

Pat. No. 3,192,800, issued July 6, 1965 to J. E. Kostur for a "Rotatable Turret Rolling Machine." The coated plastic sheets 14 may be transferred by hand or by automatic transfer apparatus such as the sheet feeder 98 shown in FIG. 4 into a head 157 of the machine 156. Such head 157 includes the clamping mechanism 40 hereinbefore described.

For the purpose of fabricating the liner 14 shown in FIG. 1, a first press 158 draws, embosses and forms the top 10c, the back 10b, and the bottom 10d of the liner 10. A second press 160 pierces, notches and vents at 10e (FIG. 1) such top 10c, such back 10b, and such bottom 10d. A third press 162 welds the top 10c, the back 10b and bottom 10d to the configuration shown in FIG. 1. Another press 164, meanwhile, notches, shears, embosses and forms the sides 10a of the liner 10. Another press 166 forms the flanges (similar to flanges 10a1 on the bottom 10d, FIG. 1) on the sides 10a and such formed flanged sides 10a are transferred adjacent the formed top 10c, back 10b and bottom 10d where an assembly means such as a welder 168 spot welds the portions together to form the line 10 shown in FIG. 1. It will be understood alternatively that the above-mentioned parts may be assembled such as by lancing or the like. Thereafter the liner 10 is spray cleaned at 170a, bonderized at 170b, dried off at 170c and the adhesive is applied by suitable spraying means at 170d to the interior surface 16 (FIG. 1) of the liner 10. The sprayed coated liner 10 is then transferred to a preheat oven 172, where such liner 10 is heated to a temperature of about 225° to about 275° F for metallic liners 10 and about 150° to 275° F for plastic liners 10 and then loaded by a transfer means 174 into the female die 18 at station 3 of the molding machine 156.

It will be understood from a consideration of the lower right-hand portion of FIG. 13 that meanwhile the plastic sheet 14 in the head 157 of the machine 156 has indexed from station to station 2 where a heating oven (not shown) heats the clamped plastic sheet 14 to its softening temperature at about 275° F to about 375° F and that as the head 157 containing the heated plastic sheet 14 indexes into station 3 of the machine 156 the coated liner 10 is simultaneously loaded into the female die 18.

At station 3 the heated plastic sheet 14 is applied to the interior surface 16 of the liner 10 as hereinbefore described with respect to the automatic vacuum forming machine described with respect to FIGS. 2–9.

Thereafter the coated liner 10 is indexed to station 4 of the machine 156 where it may be unloaded as by hand or automatically (not shown) into a trimmer 180 where the plastic is trimmed from the coated liner 10. The trimmed liner 10 may then be perforated by a perforating mechanism 182 and then transferred to storage assembly.

In FIG. 14, the sealing means $120^{14}$ is mounted on pistons 125 of fluid cylinders 126 and seals against the male die jaws 42. In addition, FIG. 14 shows the first vacuum and fluid pressurizing means 62 of the male die 36 producing a vacuum as indicated by the arrows. FIG. 14 also shows the second vacuum and fluid pressurizing means 78 applying a vacuum to the plastic sheet 14. A third vacuum and fluid pressurizing means 184a, 184b (FIG. 14) is connected to sealed chambers 126a, 126b respectively.

In FIG. 15A, the male die $36^{15}$ is provided with a first cavity 186. Vacuum line 128d and extensions 128d1a, 128d2a, 128d3a (of the first vacuum and fluid pressurizing means 62) gather the plastic material 187 into the first cavity 186 while vacuum lines 128d1 and 128d2 hold the plastic sheet 14 adjacent the first cavity 186 during the forming of the plastic sheet 14 around male die 36 similar to that shown in FIG. 6.

During the application phase of the forming cycle (as in FIGS. 8,9) the first cavity 186 registers with a hole or slot 188 (FIG. 15b) in the liner 10 and a second cavity 190 in the female die 18. As shown in FIGS. 15B, 15C, the first vacuum fluid pressurizing means 62 (male die 36) now delivers fluid pressure through lines 128d, 128d1a, 128d2a, 128d3a, and the second vacuum and fluid pressurizing means 78 (female die 18) applies vacuum through lines 192, 192a, 192b, 192c, 192d, 192e to transfer the gathered material 187 through the hole 188 into the second cavity 190. The portion 194 (FIGS. 15b, 15c) of the female die $18^{15}$ is removable to permit removal of the coated liner 10 from the female die $18^{15}$.

FIG. 16a shows a punching member 195 on the piston 196 of a fluid cylinder 198 punching a plastic slug 200 and a metal slug 202 (against a die insert 203) from the plastic sheet $14^{16}$ and liner $10^{16}$ respectively to provide holes 204, 206 in plastic sheet $14^{16}$ and liner $10^{16}$ respectively. To aid in the removal of the slugs 200, 202, a scrap slug chute 209 is provided in female die $18^{16}$ and either a vacuum line or fluid pressure line 208 is connected to the punching member 195.

In FIG. 16B, the hole 206 in the liner $10^{16}$ has already been made. The punch 195' is provided with a heating means, such as an induction coil 210 or the like, connected by lines 212a, 212b through switch 214.

FIG. 16C shows the heated punching member 195' coating the edge of the hole 206 in liner $10^{16}$ with molded plastic 216 to eliminate the raw edge on the hole 204 in liner $10^{16}$, thereby eliminating corrosion adjacent such hole 206 and milling (trimming) of the edges of the hole 206.

FIG. 17 shows a fluid cushion means such as the lines 218, 218a, 218b, 218c, 218d provided adjacent an edge or projection 220 of one of the male die $36^{17}$ or the female die (not shown) for providing fluid pressure, as indicated by the small arrows in FIG. 17, to fluid float the plastic sheet 14 around such edge or projection 220 (with clearances $C^2$, $C^3$, FIG. 17) during the forming of the plastic sheet 14 on the male die 36.

METHOD

It will be understood by those skilled in the art from the above description of the apparatus 12 (FIGS. 1–9) and the rotary machine 156 (FIG. 13) that an improved method, capable of being performed also by hand, is contemplated. This method includes the steps of:

a. loading the hollow body 10 into a female die 18 (FIGS. 1–9);

b. securing the plastic sheet 14 in clamping means 40;

c. heating the clamped sheet 14 to its softening temperature;

d. moving the clamped heated sheet 14 into registry with a male die 36 (FIGS. 1–9) and the female die 18;

e. sealing one die of the male die 36 and the female die 18 to one member of the clamping means 40 and the clamped heated plastic sheet 14 to define therewith a sealed chamber 124;

f. moving the male die 36 toward the clamped heated sheet 14 to form the clamped heated sheet 14 about the male die 36;

g. moving the male die 36 and the clamped formed heated sheet 14 against the surface 16 of the hollow body 10 in the female die 18; and h. applying fluid pressure to the clamped formed heated sheet 14 to transfer the clamped formed heated sheet 14 to the surface 16 of the hollow body 10.

SUMMARY OF THE ACHIEVEMENTS OF THE OBJECTS OF THE INVENTION

It will be recognized by those skilled in the art that the objects of this invention have been achieved by providing an improved apparatus 12(FIGS. 1–9, etc.) for and method of laminating a plastic sheet 14 onto a surface 16 of a hollow body 10. The apparatus 12 and method:

1. permit the use of thin plastic sheets 14 having desirable corrosion resistance and appearance properties over a strong metallic liner 10;
2. provide a stronger and more flexible coated hollow body, such as the inner liner 10 for a refrigerator or the like;
3. provide a plastic coating 14 which expands and contracts at a same rate or coefficient of expansion as the strong metallic hollow body or liner 10;
4. provide the desirable appearance, and cleanability of the plastic 14 and the strength of the metal in the hollow body or liner 10;
5. reduce the cost of the completed coated hollow body or liner 10;
6. provide a superior finish to that provided on a conventional painted metallic hollow liner 10 in both wear and sound-proofing properties;
7. eliminate the standard breaker strip not shown) commonly used on conventional refrigerators when a ceramic coated steel liner 10 or the like is employed;
8. permit a flexibility and texture of finish in the coated finished liner 10;
9. permit side loading of the steel or metal liner 10 into the female die 18;
10. permit air float loading (FIG. 2) of the steel or metal liner 10 into the female die 36;
11. selectively heat or cool predetermined areas A1, A2, A3, A4 of the plastic sheet 14 to provide either reinforcing or thinning of the plastic material 14;
12. cut holes 202, 204 or the like in the plastic sheet 14 and in the steel or metal liner 10 during the forming cycle (FIGS. 16a–16c);
13. withhold contact between the formed plastic sheet 14 and the hollow liner 10 until the final application of the plastic sheet 14 to the hollow body or liner 10 thereby eliminating the dragging of portions of the heated plastic sheet 14 over the edges 220 (FIG. 17) of the hollow body 10 and the tearing or stretching of the plastic sheet 14;
14. permit the formation of multiple complex shapes in the finished coated hollow body or liner 10;
15. increase production by permitting automatic removal of the completed coated hollow body 10 from the clamping means 40 of the apparatus and method by opening of the female die jaws 54 of the clamping means;
16. permit automatic sheet loading of the plastic sheet 14;
17. permit use of air flotation (FIG. 17) of the plastic sheet 14 in critical areas 220 of forming, such as a sharp corner, an edge 220 (FIG. 17) or the like of the liner 10;
18. permit the forming of blisters or bubbles 187 (FIGS. 15A–15C) of uniform thickness through holes 188 or slots or the like in the preformed hollow steel body 10;
19. permit forming of a trapped shape, such as a hole 204, a slot or the like in a hollow body 10;
20. permit the use of a resilient adhesive between the plastic sheet 14 and the metal surface 16 of the hollow body 10; and
21. minimize the rupturing of the plastic sheet 14 during the forming operation on the male die 36 and permit the use of lower strength and poorer quality plastic sheets 14 in the forming cycle.

While in accordance with the patent statutes preferred and alternative embodiments of this invention have been illustrated and described in detail, it is to be particularly understood that the invention is not limited thereto or thereby.

We claim:

1. Plastic thermoforming apparatus for laminating a plastic sheet onto a surface of a hollow body, said apparatus having:

a. a frame;
   b. a male die mounted on said frame;
   c. a female die mounted on said frame in registry with said male die and in spaced relation to said male die, said female die being adapted to receive said hollow body;
   d. clamping means operable to receive said plastic sheet and to clamp said plastic sheet in position for said thermoforming operation;
   e. heating means adjacent to said clamping means for heating said clamped plastic sheet to its softening temperature;
   f. said clamping means first being movable with said clamped plastic sheet into said heating means so that said plastic sheet is heated to its softening temperature;
   g. said clamping means being then movable with said clamped heated sheet into registry with said male die and said female die;
   h. sealing means on one die of said male die and said female die and movable with respect to said frame for sealing one member of said clamping means and said clamped heated plastic sheet to define therewith a sealed chamber extending from said one die;
   i. a vacuum and fluid pressurizing means associated with one die of said male die and said female die for applying either vacuum or fluid pressure to said one die;
   j. one member of said male die and said clamped heated sheet being movable with respect to the other member of said male die and said clamped heated sheet so that said male die engages said clamped, heated sheet and forms said clamped heated sheet about said male die within said sealed chamber prior to contact between said clamped heated sheet and said female die;
   k. one element of said male die and said female die being movable relative to the other element of said male die and said female die so that said male die and said clamped formed heated sheet move into said hollow body in said female die; and l. said vacuum and fluid pressurizing means being operable to apply either fluid pressure or vacuum against said clamped formed heated sheet to transfer said clamped formed heated sheet onto said surface of said hollow body.

2. The apparatus recited in claim 1 wherein said clamping means has a first pair of movable jaws having a first male die jaw and a first female die jaw and a second pair of movable jaws having a second male die jaw and a second female die jaw, said first and second male die jaws being movable to an open position to receive said plastic sheet on said closed first and second female die jaws.

3. The apparatus recited in claim 2 wherein said first and second female die jaws are movable to open position to release said formed heated sheet.

4. The apparatus recited in claim 1 wherein said sealing means is on said male die.

5. The apparatus recited in claim 1 wherein said sealing means is on said female die.

6. The apparatus recited in claim 1 wherein said male die has a first heating means for heating said male die to maintain said plastic sheet at said softening temperature, to selectively heat a first area of said formed heated sheet to weaken and thereby thin said first area during the forming operation or to maintain uniform thickness in a second area of said formed heated sheet.

7. The apparatus recited in claim 6 wherein said male die has a first cooling means to selectively cool and thereby thicken and reinforce a third area of said formed heated sheet which third area is subject to stress during the forming operation to maintain uniform thickness in said second area of said formed heated sheet.

8. The apparatus recited in claim 1 wherein said female die has a second vacuum and fluid pressurizing means for applying vacuum and fluid pressure to said female die.

9. The apparatus recited in claim 1 wherein said female die has a second heating means to maintain said hollow body at a predetermined temperature.

10. The apparatus recited in claim 9 wherein said female die has a second cooling means to selectively cool areas of said hollow body.

11. The apparatus recited in claim 1 and having reciprocating means connected to said clamping means for reciprocating said clamping means.

12. The apparatus recited in claim 1 wherein said first vacuum and fluid pressurizing means applies a vacuum to said heated sheet during said forming operation on said male die.

13. The apparatus recited in claim 8 wherein said second vacuum and fluid pressurizing means applies a fluid pressure to said clamped heated sheet during said forming operation on said male die.

14. The apparatus recited in claim 8 wherein said second vacuum and fluid pressurizing means applies a vacuum to said clamped heated sheet during said forming operation on said male die.

15. The apparatus recited in claim 1 and having a third vacuum and fluid pressurizing means for applying either fluid pressure or vacuum to said sealed chamber during said forming operation on said male die.

16. The apparatus recited in claim 1 wherein said female die has a pivotable inlet side to permit side loading of said hollow body into said female die.

17. The apparatus recited in claim 16 wherein said inlet side is provided with air float holes to permit air float loading of said hollow body into said female die.

18. The apparatus recited in claim 8 wherein said second vacuum and pressurizing means applies a vacuum to said clamped formed heated sheet during application of said clamped formed heated sheet to said surface of said hollow body.

19. The apparatus recited in claim 1 wherein said male die is provided with a first cavity to gather material of uniform thickness.

20. The apparatus recited in claim 19 wherein said female die is provided with a second cavity which is registerable with a hole or slot in said hollow body and said first cavity when said clamped formed heated sheet is applied to said surface of said hollow body.

21. The apparatus recited in claim 20 wherein said first vacuum and fluid pressurizing means is operable to apply fluid pressure to said first cavity to project said gathered material of uniform thickness into said hole or slot and said second cavity to provide a sealed cavity in said hollow body.

22. The apparatus recited in claim 20 wherein said second vacuum and fluid pressurizing means is operable to apply a vacuum to said second cavity to project said gathered material of uniform thickness into said hole or slot and said second cavity to provide a sealed cavity in said hollow body.

23. The apparatus recited in claim 1 and having fluid cushion means on one die of said male die and said female die for fluid floating by fluid pressure said plastic sheet over an edge or projection in said surface of said one die.

24. The apparatus recited in claim 1 wherein said first heating means has an aperture through said male die to selectively thin a first area of said plastic sheet before such plastic sheet engages said male die.

25. The apparatus recited in claim 1 wherein said first cooling means has an aperture through said male die to selectively thicken a third area of said plastic sheet before said plastic sheet engages said male die.

26. The apparatus recited in claim 1 and having selective heating means or cooling means of said plastic sheet prior to application of fluid pressure by said second vacuum and fluid pressurizing means to said plastic sheet.

27. Plastic thermoforming apparatus for laminating a plastic sheet onto a surface of a hollow body, said apparatus having:

a. a frame;

b. a male die mounted on said frame;

c. a female die mounted on said frame in registry with said male die and in spaced relation to said male die, said female die being adapted to receive said hollow body;

d. clamping means operable to receive said plastic sheet and to clamp said plastic sheet in position for said thermoforming operation;

e. heating means adjacent to said clamping means for heating said clamped plastic sheet to its softening temperature 275°–350° F;

f. said clamping means first being movable with said clamped plastic sheet into said heating means so that said plastic sheet is heated to its softening temperature 275°–350° F;

g. said clamping means being then movable with said clamped heated sheet into registry with said male die and said female die;

h. sealing means on one die of said male die and said female die and movable with respect to said frame for sealing one member of said clamping means and said clamped heated plastic sheet to define therewith a sealed chamber;

i. a vacuum and fluid pressurizing means associated with one die of said male die and said female die for applying either vacuum or fluid pressure to said one die;

j. one member of said male die and said clamped heated sheet being movable with respect to the other member of said male die and said clamped heated sheet so that said male die engages said clamped heated sheet and forms said clamped heated sheet about said male die prior to contact between said clamped heated sheet and said female die;

k. one element of said male die and said female die being movable relative to the other element of said male die and said female die so that said male die and said clamped formed heated sheet move into said hollow body in said female die;

l. said vacuum and fluid pressurizing means being operable to apply either fluid pressure or vacuum against said clamped formed heated sheet to transfer said clamped formed heated sheet onto said surface of said hollow body; and m. a punching member on one die of said male die and said female die for punching a hole or slot in said clamped formed heated sheet during the application of said clamped formed heated sheet during the application of said clamped formed heated sheet to said surface of said hollow body.

28. The apparatus recited in claim 27 wherein said punching member also punches a hole or slot in said hollow body.

29. The apparatus recited in claim 27 wherein said punching member is movable with respect to said one die.

30. The apparatus recited in claim 29 and having punching member heating means for heating said punching member to a temperature capable of melting said hole in said plastic sheet or covering the edge of the hole or slot in said hollow body with melted plastic.

31. The apparatus recited in claim 29 and having punching member vacuum and fluid pressurizing means connected to said punching member to remove the plastic from said hole or slot in said sheet.

* * * * *